Patented Mar. 27, 1934

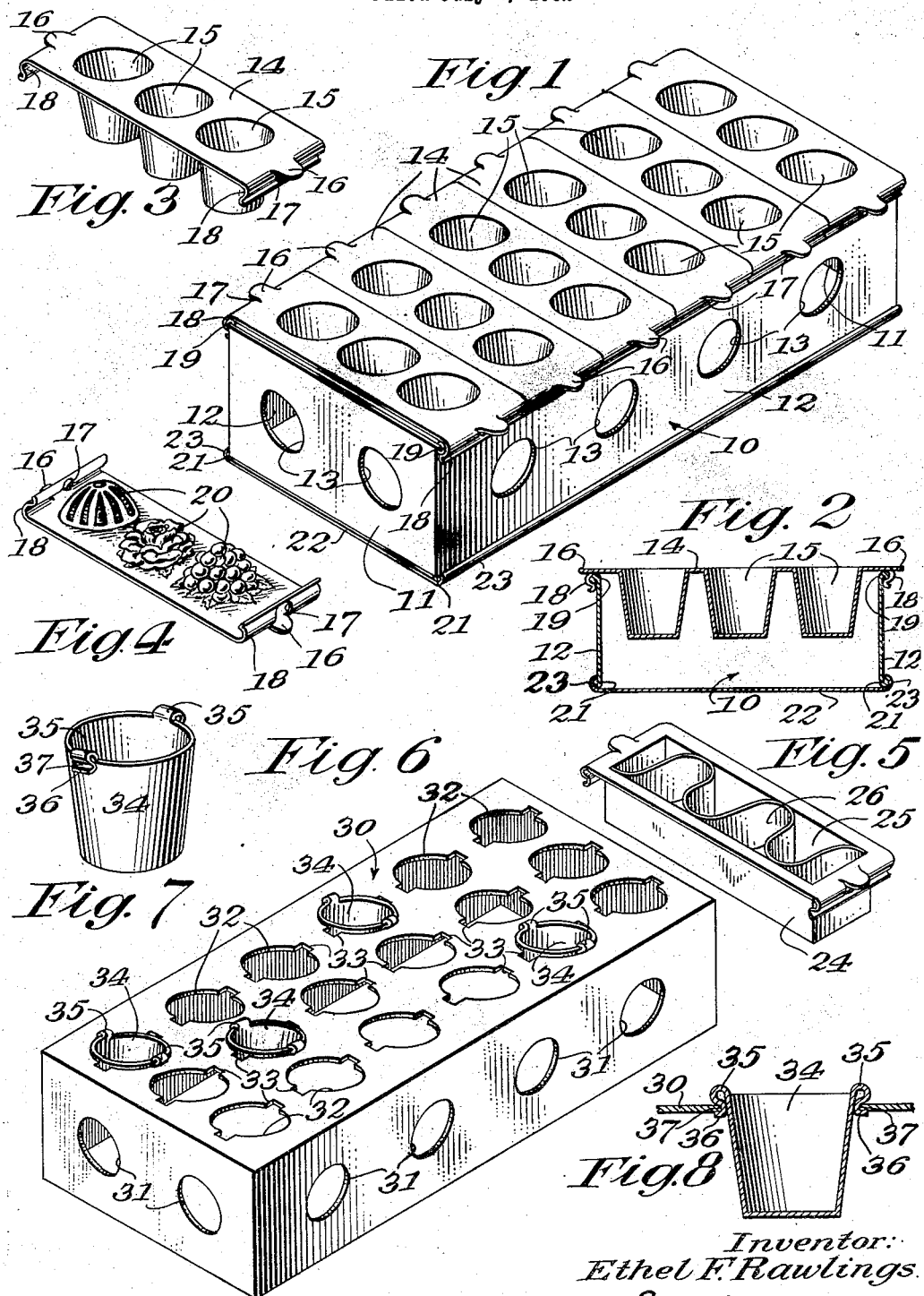

1,952,729

UNITED STATES PATENT OFFICE 1,952,729

FREEZING CONTAINER FOR REFRIGERATORS

Ethel F. Rawlings, Belmont, Mass.

Application July 5, 1932, Serial No. 620,821

9 Claims. (Cl. 62—108.5)

This invention relates to the removable freezing containers used in the freezing units of electrical or mechanical refrigerators.

The usual freezing container consists of a metal tray or pan having a fixed bottom and open top, and a removable metal grid adapted to rest on said fixed bottom and inserted into and removed from said pan through said open pan.

The objections to this type of freezing tray are numerous. The grid freezes to the metal pan bottom and the ice cubes freeze to the partition strips of the grid, so that the grid cannot be released from the grid until the frozen union of grid to pan and cubes to grid has been broken by pouring water over both. This is a slow and disagreeable process and results in much wastage of ice cubes, due to the fact that when the frozen union of cubes to grid has been broken, more cubes are released than are usually wanted.

All rubber grids and trays have been devised, as have combinations of rubber and metal in the effort to overcome these objections.

Trays have also been devised in which the grids instead of being of the conventional honeycomb type have been formed as bent resilient strips of metal.

None of these expedients has been entirely satisfactory. The all rubber trays and grids so effectively insulate the water to be frozen as to require a considerably longer freezing time for the formation of ice cubes. The bent metal strip type of grid tends to freeze so solidly in the tray as to be extremely difficult of removal.

To the end therefore of overcoming these several objections to existing types of freezing containers, I have devised my present invention.

According to it the ice molds are removable from the container either as individual units or in predetermined groups.

This permits removal of only the desired number of ice blocks at a time, with consequent avoidance of wasted ice.

The molds are so mounted in the pan or tray as to enable the selected number of molds to be withdrawn with the minimum of time and effort, and the arrangement is such that all tendency of the molds themselves to freeze solid to the pan itself is obviated.

This results from the fact that the molds themselves are individual freezing units in which the water to be frozen is placed and frozen, as distinguished from the usual freezing container where the water is poured in the pan and the grid freezes solid with the pan bottom. In fact the bottom of my freezing pan functions primarily as a spacing wall between the molds and the bottom of the freezing unit proper of the refrigerator and exists mainly to prevent the frosted coating which forms on the walls of the freezing unit proper from freezing up between the molds themselves. Such pan bottom therefore may be removable, if desired, so as to facilitate filling of the molds with the water to be frozen, and for purposes of cleaning. Similarly it may be made, if desired, of some material, as rubber, paper pulp, celluloid, or other composition material to which ice will not readily adhere, or may be coated with some substance to which ice will not readily adhere so that it may be easily withdrawn from the freezing unit.

As illustrative of the principles involved, I describe and show in the accompanying specification and drawing several embodiments of my invention which recommend themselves on account of their structural and functional possibilities. In such drawing:

Fig. 1 is a perspective view of one form of freezing container in accordance with my invention.

Fig. 2 is a transverse section therethrough.

Fig. 3 is a detail perspective of one of the ice molding units shown in Figs. 1 and 2, removed from the pan.

Fig. 4 is a detail perspective of a modified form of molding unit, removed, and shown bottom side up.

Fig. 5 is a similar view of another modified form of molding unit, removed.

Fig. 6 is a perspective view similar to Fig. 1 but showing a further modification of pan and molding units.

Fig. 7 is a detail perspective view of one of the mold units shown in Fig. 6, removed, and Fig. 8 is a fragmentary cross section particularly illustrating the method of releasably locking the unit of Fig. 7 to the pan of Fig. 6.

Referring to Fig. 1, I have indicated generally at 10 a freezing container of conventional size and shape presenting a bottom wall 22, end walls 11 and side walls 12. Unlike the usual pan or tray however, the side and end walls, or both, may be opened as indicated at 13 to permit circulation of the freezing air through the pan and into and between the mold units suspended with said pan, thus increasing the freezing time of the ice being frozen in such molds.

In the forms of my invention shown in Figs. 1 to 5 inclusive, the mold units 14 in Figs. 2 and 3, 20 in Fig. 4, and 24 in Fig. 5, are of plural capacity, being adapted to mold a group (here shown as three) of ice blocks or shapes, and consequently being insertible into and removable from the pan as units.

In these several forms, the mold units are strips formed for quick detachable engagement with the pan. They preferably extend transversely of the pan across the open top thereof, being provided at their ends with downwardly and inwardly rolled locking edges 18 adapted to be snapped over the outwardly rolled edges 19 of the side walls 12 of the pan. Such edges 18 may be slotted as indicated at 17 and the material of the slots bent horizontally outwardly as at 16 to provide grasping portions under which the fingers may be inserted when releasing the stips from the pan.

Similarly, the pan bottom 22 itself may if desired, also be formed for quick detachable engagement with the side walls 12 of the pan, as by providing it with channel edges 23 adapted to be slid longitudinally over the rolled edges 21 at the bottom of the side walls 12.

In Fig. 3 the individual molds 15 of the strip 14 are formed as depending cups, preferably integrally with the strips. These may be of any desired size and shape, as for example, hearts, diamonds, clubs, spades, etc. For convenience of illustration they are shown of conventional cylindrical or frustro-conical shape.

In Fig. 4, the under side of the strip is shown, and consequently the molds extend as upwardly projecting formations 20 of unusual design. The several designs shown of course are only suggestive of the many designs possible.

In Fig. 5 the strips 24 are shown as closed at their bottom, ends and sides, so as to form a closed receptacle for the water to be frozen. Confined within such receptacle is a bent strip 26 of resilient material, the convolutions of which define with the side walls 25 of the receptacle a plurality of freezing compartments.

In the modification of Figs. 6, 7 and 8 the pan is provided with a top wall 30 which has symmetrically dispersed over its area a plurality of rows of holes 32 formed with offsets 33. The mold units 34 are inserted from above through said holes and are interlocked therein by partial rotation relative to the pan top.

Unlike the forms of Figs. 1 to 5, the molds 34 are individual units, being of cup or other appropriate shape. They constitute individual holders for the water to be frozen, and are individually fillable and removable from the pan.

Preferably, they are provided at their upper edges with oppositely disposed outwardly rolled resilient locking formations 35 which are bent inwardly as at 37 and terminate in outwardly disposed locking lips 36. These are registered with the offsets 33 and inserted therethrough and then turned through a partial revolution to the positions of Figs. 6 and 8, the channels 37 guiding on the edges of the cover 30 surrounding the holes 32 with the lips 36 disposed beneath the cover and thus locking the molds 34 in position within the pan. Being resilient the lips 36 allow the cups to be readily released even when expanded outwardly against the edges of the holes 32 by the ice frozen therein.

With this form of device, I may if desired remove all of the frozen blocks of ice from their molds 34 without removal of the molds themselves from the pan by first removing the pan bottom, turning the pan upside down, and pouring water over the molds. This is a decided advantage over earlier forms where the molds are not positively interlocked with the pan and consequently would themselves drop by gravity out of the pan if the pan were turned upside down, thereby necessitating the subsequent individual removal of each block of ice from each individual mold thus released from the pan.

In all forms, the mold units are spaced from the side, end and bottom walls of the pan and are freely and quickly removable as desired. Since the pan proper does not contain the water to be frozen, the molds have no tendency to freeze solid in the pan, as with the ordinary metal pan and grid. Instead, the mold units themselves receive the water which is frozen directly in them.

Both the pan and the mold units may be made of any suitable material. For example, the mold units may be made of paper pulp, waxed or otherwise coated to prevent the ice from closely adhering thereto, and hence adapted to be thrown away after one use, or they may be made of metal. The pan is preferably made of metal, but the pan bottom of any suitable material to which ice does not readily adhere.

Various modifications in the construction and operation of my device may obviously be resorted to if within the spirit and scope of my invention without departing from the limits of the appended claims.

What I therefore claim and desire to secure by Letters Patent is:—

1. A freezing container for use in the freezing unit of a refrigerator, comprising a walled container having a closed bottom and an open top and slidable into and out of the freezing unit, and a plurality of removable ice molds insertible into said container from above through said open top and protected against ice from said freezing unit forming thereon by said bottom wall, said units being suspended within said container by positive interlocking engagement of their upper edge portions with a top edge portion of the container and being spaced from the container bottom, and said container bottom being formed for quick detachable engagement with the walls of the container whereby it may be removed at will.

2. A freezing container as claimed in claim 1, wherein the ice molds are formed as individual units which are interlocked with a top edge of the container by partial revolution of the units relative to the container.

3. A container as claimed in claim 1, wherein the container is provided with a cover having holes therein, each hole having an offset, and the ice molds are individual units having each a spring locking formation adapted to be registered with and inserted through such offset and locked under the edge of the hole by partial revolution of the unit relative thereto.

4. A container as claimed in claim 1, wherein the ice molds are formed as a plurality of strips, each provided with depending mold units, and each adapted for quick detachable engagement at its ends with the upper edges of the side walls of the container.

5. A freezing container for use in the freezing unit of a refrigerator, comprising a walled container having side, end and bottom walls and an open top, and a plurality of strips disposed across the open top of said container, each strip provided with depending mold units, and each strip formed at its ends with means adapted for spring locking engagement with the upper edges of the side walls of said container, the mold units of said strips depending into said container and being protected against ice from the freezing unit forming thereon by said bottom walls of the container.

6. A container as claimed in claim 5, wherein the ends of the mold strips are formed as resilient locking lips.

7. A container as claimed in claim 5, wherein the ends of the mold strips are formed as resilient locking lips and said lips are slotted to provide outwardly extending projections constituting finger lifting portions by means of which said strips may be released from their locking engagement with the container side walls.

8. A freezing container for use in the freezing unit of a refrigerator, comprising a walled container having a closed bottom, side and end walls, and an open top, said bottom being formed for quick detachable engagement with the side walls of said container whereby it may be removed at will, and a plurality of individual ice molds suspended within said container and spaced from the bottom wall thereof.

9. A freezing container as claimed in claim 8 wherein the side and end walls or either of them are opened to permit circulation of cold air through the container and by and between the mold units suspended therein.

ETHEL F. RAWLINGS.